(12) United States Patent
Gutkuhn et al.

(10) Patent No.: US 9,969,506 B2
(45) Date of Patent: May 15, 2018

(54) ACCESS DEVICE TO AN AIRPLANE

(71) Applicant: Hübner GmbH & Co. KG, Kassel (DE)

(72) Inventors: Detlef Gutkuhn, Espenau (DE); Lothar Scharf, Bad Sooden-Allendorf (DE); Reinhard Hübner, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days. days.

(21) Appl. No.: 15/424,400

(22) Filed: Feb. 3, 2017

(65) Prior Publication Data

US 2017/0225803 A1 Aug. 10, 2017

(30) Foreign Application Priority Data

Feb. 4, 2016 (DE) .......................... 10 2016 001 273
Sep. 7, 2016 (EP) ..................................... 16187620

(51) Int. Cl.
B64F 1/315 (2006.01)
E06C 5/00 (2006.01)

(52) U.S. Cl.
CPC ............... B64F 1/315 (2013.01); E06C 5/00 (2013.01)

(58) Field of Classification Search
CPC .................................. B64F 1/315; E06C 5/00
USPC ................................................. 14/69.5, 71.5
See application file for complete search history.

(56) References Cited

U.S. PATENT DOCUMENTS

| | | | | |
|---|---|---|---|---|
| 2,470,337 A * | 5/1949 | Campbell | ............... | E04F 10/02 135/131 |
| 3,046,850 A * | 7/1962 | Tellefson | ............... | B61D 23/02 114/201 R |
| 3,048,680 A | 8/1962 | Mccloud | | |
| 3,524,563 A * | 8/1970 | McCartney | ............... | B64F 1/32 105/370 |
| 4,517,698 A * | 5/1985 | Lamp'l | ..................... | B64F 1/32 14/69.5 |
| 5,040,257 A * | 8/1991 | Bentz | ..................... | B64F 1/315 14/70 |
| 7,069,611 B2 * | 7/2006 | Larson | ..................... | B64F 1/30 14/71.1 |
| 7,836,536 B2 * | 11/2010 | Motohashi | ................ | B64F 1/31 14/71.3 |
| 9,238,512 B1 * | 1/2016 | Keith | ..................... | B64F 1/315 |
| 9,284,066 B2 * | 3/2016 | Larson | ..................... | B64F 1/305 |
| 2015/0191258 A1 | 7/2015 | Gutkuhn et al. | | |

FOREIGN PATENT DOCUMENTS

| | | |
|---|---|---|
| DE | 8815054 U1 | 1/1989 |
| DE | 69602497 T2 | 2/2000 |
| EP | 0256976 A2 | 2/1988 |
| EP | 2003086 A2 | 12/2008 |
| FR | 921163 A | 4/1947 |
| FR | 2667045 A1 | 3/1992 |
| WO | 0188274 A1 | 11/2001 |
| WO | 2014040584 A1 | 3/2014 |
| WO | 2015136191 A1 | 9/2015 |

* cited by examiner

*Primary Examiner* — Raymond W Addie
(74) *Attorney, Agent, or Firm* — Dinsmore & Shohl LLP

(57) ABSTRACT

An access device to an aircraft, bus or building. The access device having a loading surface connected to a vehicle, wherein a protective device for passengers is arranged on the loading surface.

21 Claims, 7 Drawing Sheets

ACCESS DEVICE TO AN AIRPLANE

CROSS-REFERENCE TO RELATED APPLICATIONS

This patent application claims priority of European Patent Application No. EP 16 187 620.6 filed Sep. 7, 2016 and German Application DE 102 016 001 273.0 filed Feb. 4, 2016, the content of which are incorporated herein in its entirety.

FIELD OF THE INVENTION

The invention relates to an access device to an aircraft. So-called access tunnels to an aircraft, for example from a parking bus or from a building part, are known from the prior art. Such access tunnels are used when access to the aircraft should be made possible for passengers from an exit, for example of a building, at ground level to the taxiway area without being exposed to weather conditions.

BACKGROUND OF THE INVENTION

An access tunnel is known from the prior art in accordance with PCT/DE2013/000513, which has a plurality of tunnel elements, whereby the access tunnel can be adapted to the required length. It is known in detail from this citation that two tunnel elements are pushed into one another to protect the individual tunnel elements from contamination, and also from weather effects overall. Provision is furthermore made in this respect that a substantially rigid tunnel element as a base element has at least one further tunnel element in the manner of a concertina for extension, with the substantially rigid tunnel element as the base element being able to receive the tunnel element formed in the manner of a concertina in it in the manner of a garage.

Another access tunnel to an aircraft is known from FR 28 86 624 A, which has both a plurality of telescopic tunnel elements and two rigid tunnel elements at the end sides that are intended to serve as guide elements on the moving of the access tunnel. This access tunnel is thus variable in length. Thus the space requirements of the access tunnel on the airport apron are variable.

Yet another access tunnel to an aircraft is known from WO 01/88274 A1, wherein individual tunnel elements are telescopically connected to one another. It is disadvantageous in this respect that if a plurality of such tunnel elements are telescopically connected to one another, the clearance width reduces more and more over the length of the tunnel elements. Therefore the number of the tunnel elements that may be connected in such a manner are absolutely limited. It is also disadvantageous that, due to the guiding of the individual tunnel elements into one another, a substantial force is required to pull the individual elements apart to form the access tunnel. This is because, as already stated, the frameworks of the individual tunnel elements are connected to one another in a guided manner.

All the previously described access tunnels are furthermore disadvantageous as they are difficult to handle during transportation over the airfield, and the small diameter of the rollers of the tunnel elements that form the access tunnel makes it difficult to guide them on the airport apron. Accordingly, there exists a need in the art for an alternative or improved design for an access device to an aircraft.

SUMMARY OF THE INVENTION

The underlying object of the invention is to enable transporting a plurality of the tunnel elements forming an access tunnel without problem to any desired point on the airfield or on the apron of the airport.

An access device to an aircraft, a bus or a building is provided to achieve the object, wherein the access device comprises a vehicle. The vehicle may have a loading surface connected to the vehicle. A protective device for passengers is also arranged on the loading surface.

A passenger may travel through the protective device that comprises at least one, but preferably a plurality of tunnel elements that are in particular movable by rollers to the intended site on the loading surface, for example to an aircraft. The rollers also enable to move the individual tunnel elements from the loading surface and to provide an access tunnel between, for example, the airport bus and the aircraft.

Provision is made in accordance with a further advantageous feature that the vehicle is configured as a self-propelled air passenger stair vehicle. This means that the air passenger stair vehicle has a loading surface on which a protective device is located that comprises at least one tunnel element, but preferably a plurality of tunnel elements. It further becomes clear from this that the access tunnel, formed from the individual tunnel elements, extends, for example, between the airport bus and the air passenger stairs. In accordance with a further advantageous feature, the tunnel elements can be supported telescopically in one another on the loading surface, which can in particular be effected in that the tunnel elements are themselves formed as conical. Thus, a plurality of tunnel elements can be transported without problem to any desired site of the airport apron with the aid of an access device and then the tunnel elements can be pulled apart at the site to form an access tunnel.

The loading surface can be arranged as freely projecting at the vehicle in accordance with a first embodiment.

In accordance with a variant of the first embodiment, the loading surface is horizontally attachable to the vehicle, in particular horizontally pivotable by 180°. With smaller aircraft, the boarding of the aircraft typically takes place via the air stairs present in the aircraft. This means that air passenger stairs cannot be used there due to the size relationships. In order to use an air passenger stair vehicle to transport the protective device and to allow passengers' access to the aircraft through an access tunnel even with a small aircraft, provision is made that the loading surface is pivotable, in particular by 180°, next to the vehicle. When the access tunnel is located next to the air passenger stair vehicle, it allows the passengers to reach the aircraft, for example from an airport bus, through the access tunnel formed from individual tunnel elements without being exposed to weather influences.

Provision is further made in this connection that the loading surface is lowerable to allow a rolling off of the individual tunnel elements that have rollers.

Provision is made in accordance with a further second embodiment that the loading surface has a chassis such that the loading surface can act as a trailer. In order to move the individual tunnel elements from the loading surface, provision is made to design the loading surface as lowerable, and indeed to the extent that the chassis itself is lowerable.

It has further proved to be advantageous, with a plurality of tunnel elements, to fix the front tunnel element on the loading surface such that the tunnel elements, which are supported in one another, can be pulled apart in a simple manner.

Provision is made in accordance with a third embodiment that the air passenger stair vehicle has a stair device, with the stair device being vertically adjustable by a lifting apparatus at at least one end while creating a free space above the loading surface. It is achieved by creating a free space that the tunnel elements can be supported beneath the stair device during the transportation of the tunnel elements on the airport apron. It is therefore not necessary, as in accordance with the first and also the second embodiment, that a separate, for example pivotable, loading surface is provided; the loading surface can rather be located directly on the vehicle, with, as already stated, the tunnel elements being located on the loading surface beneath the raised stair device for the transport of the tunnel elements. Thus the vehicle does not need a trailer, is therefore relatively short and is in this respect easy to maneuver.

Provision is made in accordance with a feature of this third embodiment that the lifting device is arranged at the rear part of the air passenger stair vehicle. The lifting device advantageously comprises two lifting columns that receive the stair device, and guides and/or displaces the stair device vertically. The raising of the rear end of the stair device can in this respect take place, for example, hydraulically, pneumatically or also purely mechanically by a revolving chain drive in the lifting columns. At the front end, that is at the end facing the vehicle, the stair device can already be raised while taking account of the height of the operator's cabin of the vehicle in that, for example, provision is made that the stair device is seated on a mounting in this region of the air passenger stair vehicle. Since different aircraft types have the access doors at different heights, provision is made in accordance with a further feature of the invention that the mounting on which the front end of the stair device is supported is vertically adjustable. The mounting can have supports, in particular telescopic supports, connected in an articulated manner to the vehicle. The supports may be arranged in parallel with one another, and connected by a traverse. The traverse is advantageously arranged at the telescopic supports and is pivotable about a horizontal axis.

In accordance with another feature of the invention, the stair device is provided with a connecting stair segment in the rear region at the access side. The connecting stair segment is arranged telescopically in the stair device, whereby it is ensured that the stair device can be adapted to aircraft types having accesses of different heights by extending the stair device.

The pulling out or retracting of the connecting segment from the stair device can take place by a rack-and-pinion drive or by a chain drive, for example. The stair device slides on the traverse of the mounting while so doing. Alternatively, a rack-and-pinion drive or chain drive can be provided between the traverse of the mounting and the lower side of the stair device.

In accordance with yet another feature of the invention, the stair device is formed in a tunneled manner, with the connecting stair segment also preferably being tunneled. Such a tunneled connecting stair segment can have a connecting frame at the lowerable end, said connecting frame extending substantially perpendicular in the lowered state of the stair device and serving the connection of a tunnel element standing on the airport apron such that a substantially gap-free transition is formed between the protected device formed by the tunnel elements and the tunneled stair device. Thus the passengers are protected from the influences of the weather in the transition region that is between the stair device and the protective device. The lowered state is understood as a state in which passengers can mount the stair device.

The invention will be described in more detail below by way of example with reference to the figures.

DETAILED DESCRIPTION OF THE INVENTION

Figure 1:
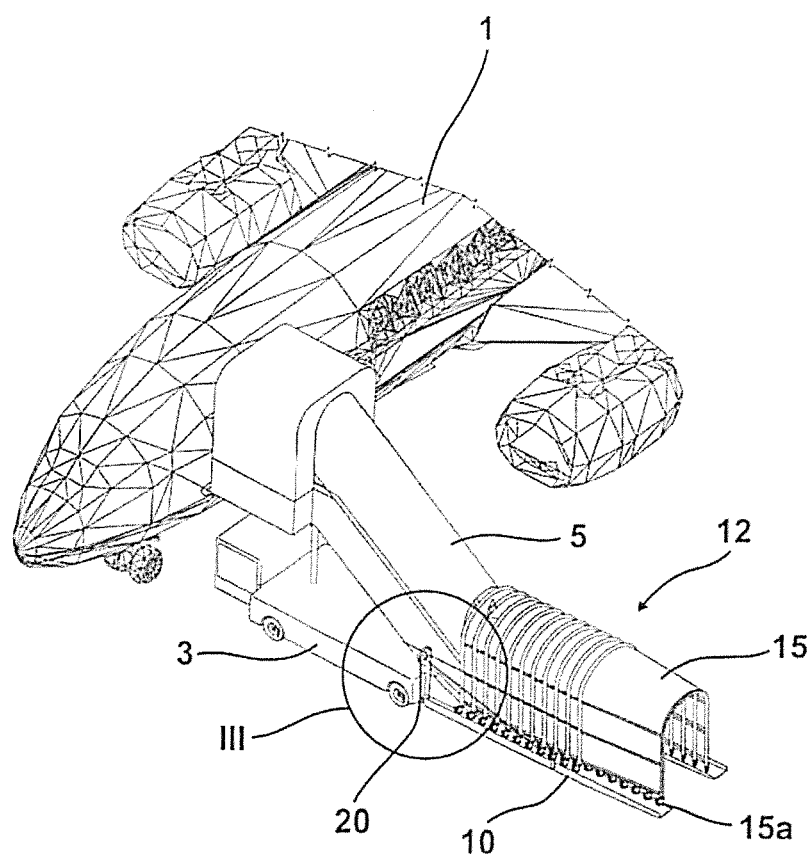
FIG. 1 shows a perspective view of an air passenger stair vehicle that has a freely projecting loading surface for receiving a protective device.
Figure 2:
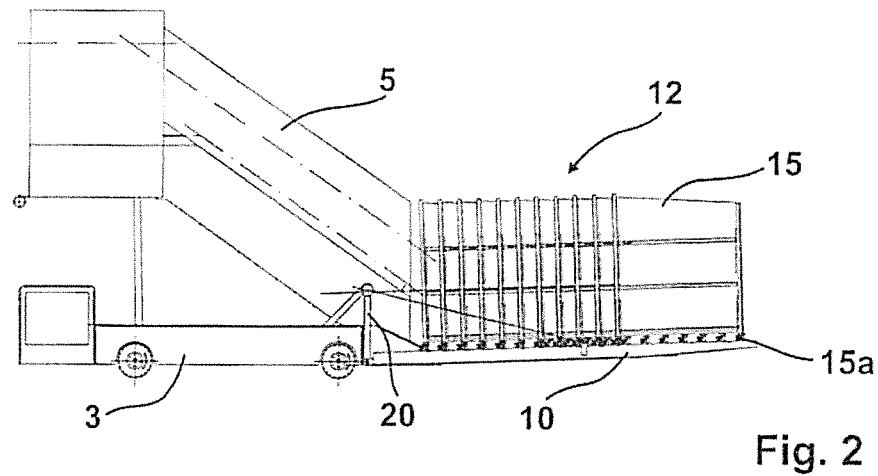
FIG. 2 shows a side view of the vehicle in accordance with FIG. 1.
Figure 3:
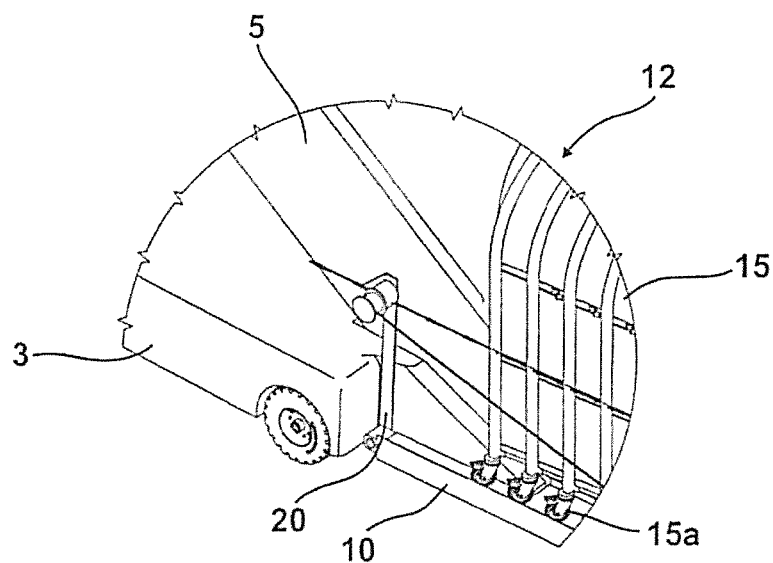
FIG. 3 shows a representation in accordance with FIG. 1 in which the loading surface is lowered.

The aircraft in accordance with FIGS. 1 to 5 is marked by 1. The air passenger stair vehicle 3 having the air passenger stairs 5 is docked at the aircraft 1, with the air passenger stair 5 enabling access to the aircraft. In accordance with a first embodiment, the loading surface 10 (FIG. 1 to FIG. 3) is connected in an articulated manner and is freely projecting at the air passenger stair vehicle 3. The loading surface 10 receives the protective device 12 that comprises a plurality of tunnel elements 15. The tunnel elements 15, that are conical, can be arranged on the loading surface 10 supported telescopically in one another. The loading surface 10 can be lowered onto the ground with the aid of a lifting device 20 (FIG. 3) in order to move the individual tunnel elements 15 apart to form the access tunnel, for which purpose the individual elements can have wheels 15a on their lower sides. The loading surface 10 comprises two rails extending in parallel with one another.

Figure 4:
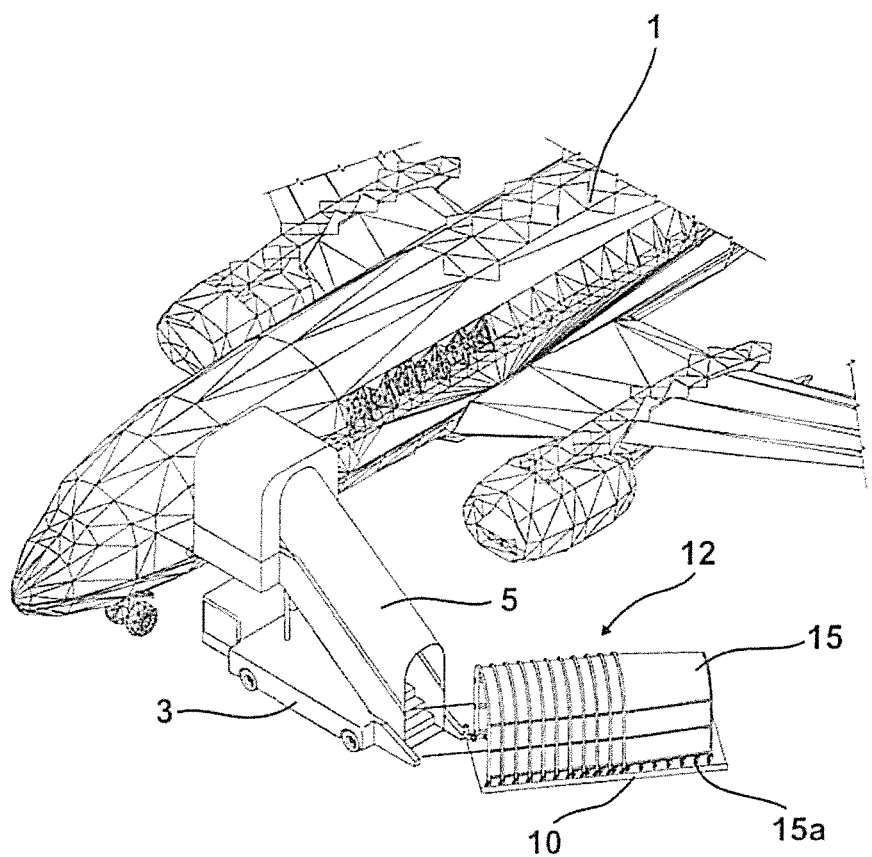
FIG. 4 shows an air passenger stair vehicle having a freely projecting loading surface, with the loading surface being connected in an articulated manner to the air passenger stair vehicle wherein the loading surface is laterally pivotable by 180°.
Figure 5:
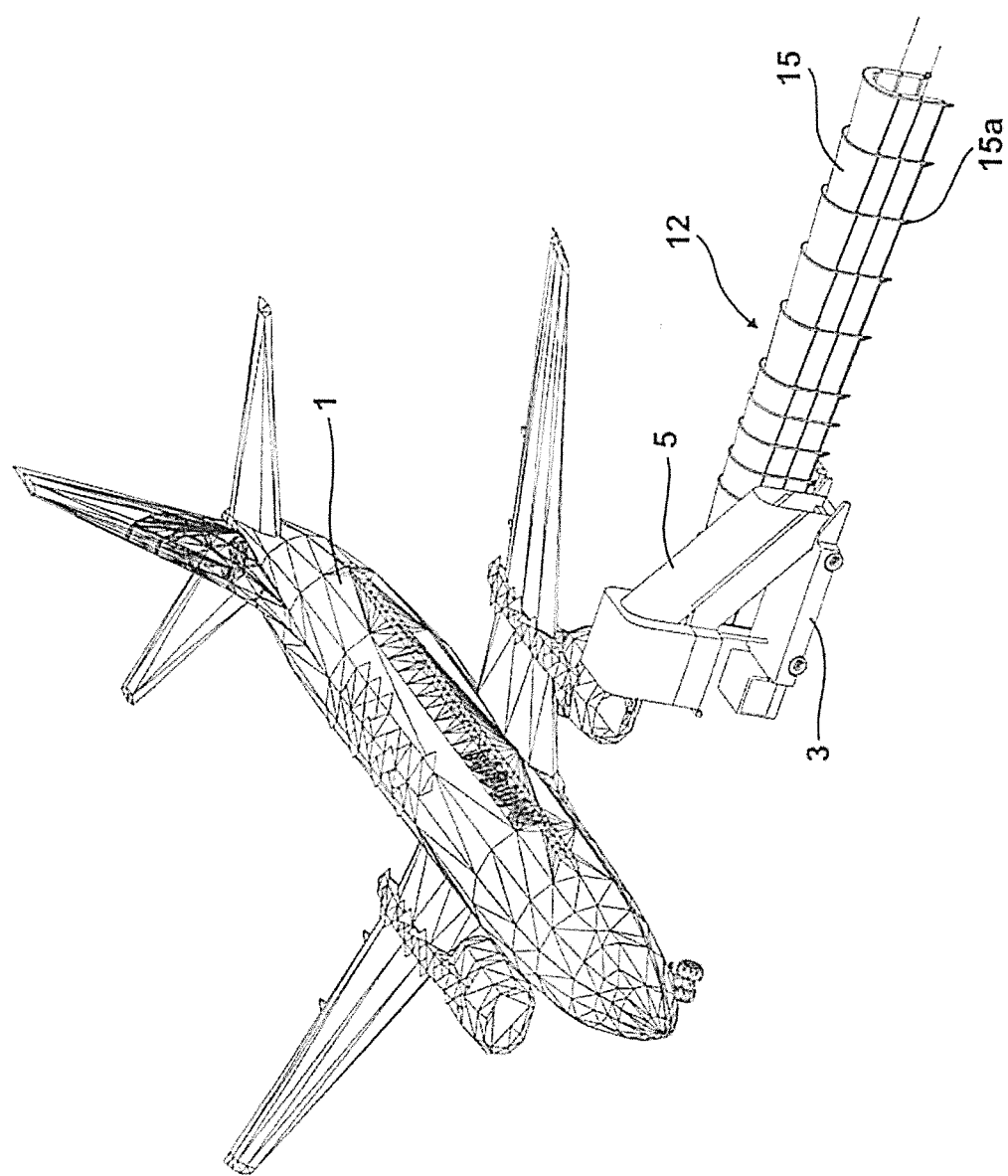
FIG. 5 shows a representation in accordance with FIG. 4 in which the individual tunnel elements of the protective device are pulled apart for forming an access tunnel in a lowered and pivoted position of the loading surface.

As a variant of the first embodiment, provision is made in accordance with FIGS. 4 and 5 that the loading surface 10 is connected in an articulated manner horizontally pivotably to the air passenger stair vehicle such that, as shown in FIG. 5, it is located laterally in parallel with the air passenger stair vehicle 3 after pivoting by 180°. The loading surface, which is shown over its full surface, is then lowered in this position to be able to pull out the tunnel elements 15 located thereon to form the access tunnel, for example to an airport bus. The tunnel elements 15 are conical, as already explained above, and have wheels 15a.

Figure 6:
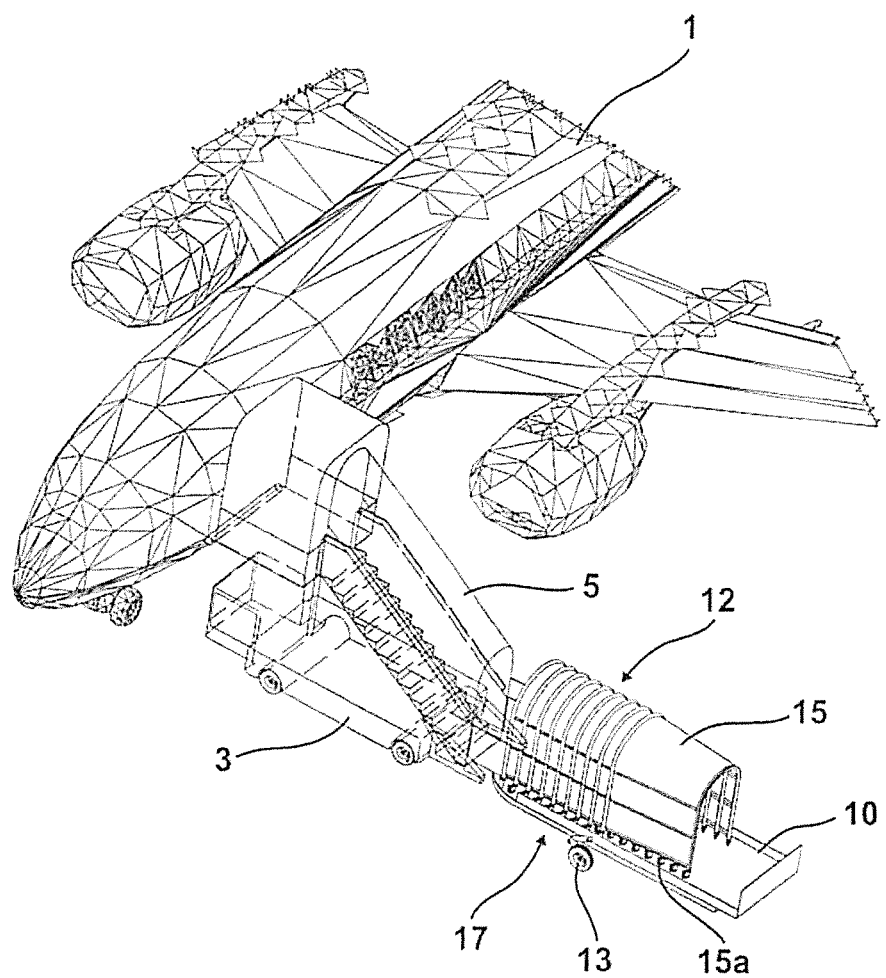
FIG. 6 shows an air passenger stair vehicle with a trailer on which the protective device comprising a plurality of tunnel elements is supported.

In a second embodiment, as shown in FIG. 6, a trailer 17 is hitched to the air passenger stair vehicle 3, with the trailer 17 comprising the loading surface 10 and the chassis 13, with the chassis 13 being lowerable such that at least the rear end of the loading surface 10 of the trailer 17 can stand on the ground to be able to move the individual tunnel elements 15 of the protective device 12 from the loading surface 10, as has been explained in the first embodiment.

To be able to pull the individual tunnel elements 15 apart from the loading surface 10 for forming the access tunnel, the front tunnel element is advantageously fixed on the loading surface 10, for example by blocking the wheels 15a of the tunnel element 15 that directly faces the air passenger stairs 5.

Figure 7:
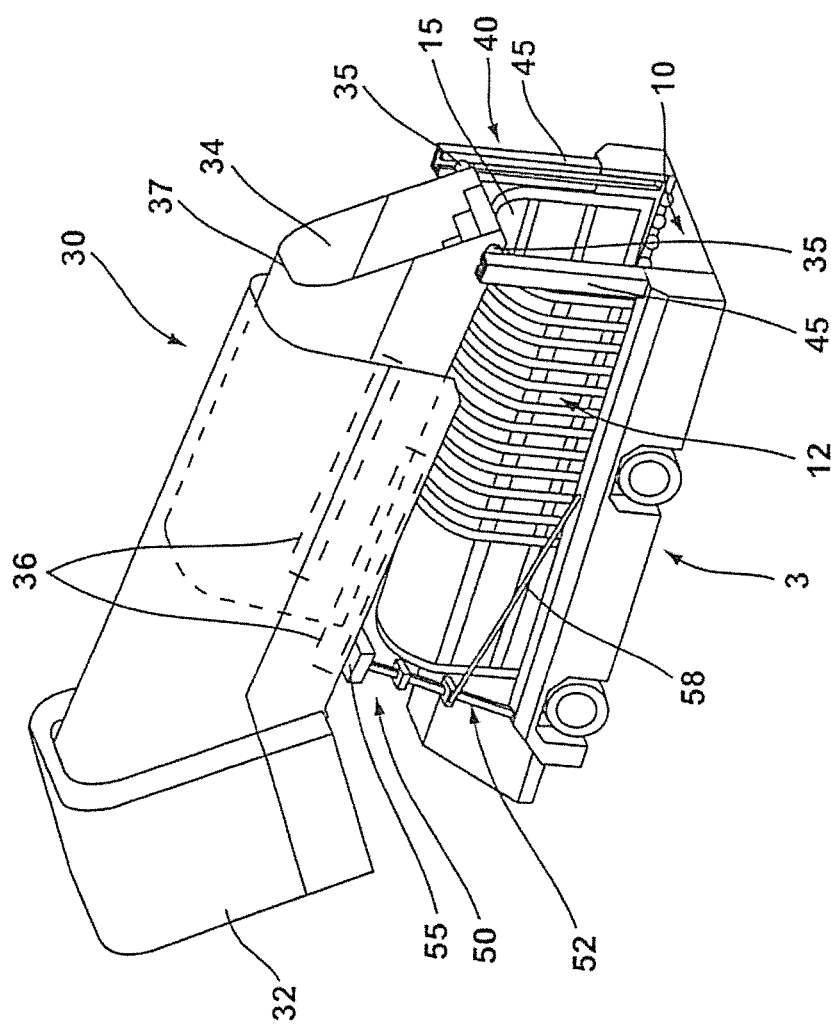
FIG. 7 shows an air passenger stair vehicle with a protective device having a plurality of tunnel elements arranged beneath a stair device.
Figure 8:
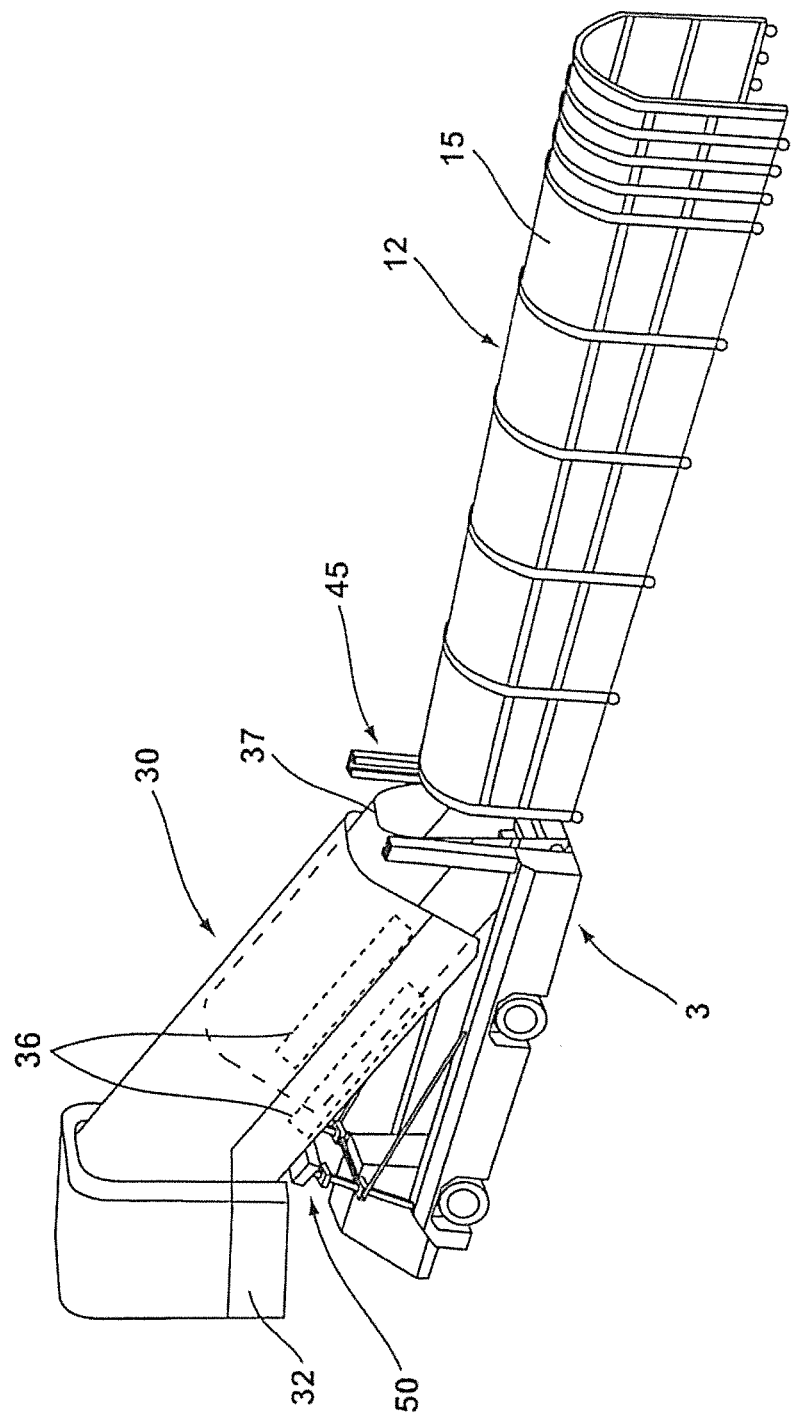
FIG. 8 shows a representation in accordance with FIG. 7, with the end of the stair device facing the protective device being lowered.

According to a third embodiment, the air passenger stair vehicle 3, as shown in FIGS. 7 and 8, comprises a loading surface 10, that is in particular lowerable, for receiving the protective device 12, comprising a plurality of tunnel elements 15. The air passenger stair vehicle 3 has a lifting apparatus 40 at the rear end, with the lifting apparatus 40 comprising two lifting columns 45 that are arranged spaced apart from one another and that serve the guidance of the rear stair device 30 at the end near the access side. The connecting stair segment 34 has a respective cam 35 at both sides for receiving the stair device 30, with each cam 35 being guided by a lifting column 45. The lifting column 45 is formed with approximately a C profile in cross-section to receive the corresponding cam 35. The raising of the stair device 30 in the rear end region of the vehicle can be effected either hydraulically or pneumatically e.g. by piston-in-cylinder drives or also by a respective chain drive arranged in each lifting column 45.

The air passenger stair vehicle 3 furthermore has the mounting 50 in the front end for supporting the front end of the stair device 30. The mounting 50 comprises telescopic supports 52 that are arranged at both sides of the air passenger stair vehicles, that are variable in length, and that are connected to one another at the upper end by a traverse 55. The traverse is supported at the telescopic supports 52 pivotable about a horizontal axis. The front end of the stair device 30 lies on the traverse 55. The telescopic supports 52 each have a support arm 58 that is arranged at the air passenger stair vehicle 3 at one end and at the telescopic support 52 at the other end. The stair device 30 that is provided with stairs and that is tunneled has the connecting stair segment 34 that likewise has treads and is likewise tunneled. The connecting stair segment 34 is telescopically supported in the stair device. Thus the stair device is variable in length to adapt to different aircraft heights. The length variation of the stair device 30 is effected by a vertical adjustment of the mounting and/or by the telescoping of the connecting segment 34 out of or into the stair device 30. The connecting stair segment 34 furthermore shows a connection frame 37 that is aligned substantially perpendicular in the lowered state of the stair device 30 and that serves as a connection to a corresponding frame of a tunnel element 15.

At the front end facing the aircraft, the stair device 30 has the coupling module 32 that can have a folding awning, not shown, at its free end.

The operation of the air passenger stair vehicle 3 is described as follows: In the state shown in FIG. 7, the air passenger stair vehicle 3 is bought near the aircraft. The protective device 12 having the individual tunnel elements 15 is then pulled out of the loading surface 10 of the air passenger stair vehicle 3. The loading surface 10 can optionally be lowered for this purpose. Then the stair device 30 is lowered at the rear end, that is in the region of the connecting stair segment at the two lifting columns 45, until a position as shown in FIG. 8 is reached. The front end of the stair device 30 can then be raised so far together with the coupling module 32 with the aid of the telescopic supports 52 of the mounting 50 until the coupling module 32 reaches the access region of the aircraft. If the required height for reaching the access of the aircraft cannot be reached by the stair device, the required length can be provided by the telescopic capability of the connecting stair segment 34 of the stair device 30. The moving apart of the connecting stair segment 34 from the stair device 30 can be effected by a rack- and pinion drive or chain drive 36 arranged between the stair device 30 and the connecting stair segment 34. Alternatively, such a rack-and-pinion drive or chain drive can be located between the traverse 55 and the stair device 30. To ensure that the traverse 55 can contact the lower side of the stair device 30 over the whole area when the mounting 50 is vertically adjusted, provision is made that the traverse is connected to the telescopic supports pivotable about a horizontal axis.

REFERENCE NUMERAL LIST 1 aircraft
3 air passenger stair vehicle
5 air passenger stair
10 loading surface
12 protective device
13 chassis
15 tunnel element
15a wheels
17 trailer
20 lifting device
30 stair device
32 coupling module
34 connecting segment
35 cam
36 chain drive/rack-and-pinion drive
37 connecting frame
40 lifting apparatus
45 lifting column
50 mounting
52 telescopic support
55 traverse
58 support arm

The invention claimed is:

1. An access device to an aircraft, bus or building for passengers, comprising:
 a loading surface connected to an air passenger stair vehicle, the air passenger stair vehicle having a front end and an opposing rear end; and
 a protective device disposed on the loading surface, the protective device having a first end and an opposing second end, at least the second end of the protective device having rollers operable to enable the second end to be removable from the loading surface to a ground surface.

2. An access device according to claim 1, wherein the protective device comprise at least one tunnel element.

3. An access device according to claim 2, wherein the at least one tunnel element is movable.

4. An access device according to claim 3, wherein the at least one tunnel element comprise rollers for movability.

5. An access device according to claim 2, wherein the at least one tunnel element is adapted to be supported telescopically into the another at least one tunnel element on the loading surface.

6. An access device according to claim 1, wherein the loading surface is horizontally pivotably attached to the vehicle.

7. An access device according to claim 6, wherein the loading surface is pivotable by 180° with respect to the vehicle.

8. An access device according to claim 1, wherein the loading surface is lowerable.

9. An access device according to claim 1, wherein the loading surface projects from the vehicle.

10. An access device according to claim 9, further comprising a lifting device, wherein the projecting loading surface is lowerable by the lifting device.

11. An access device according to claim 2, wherein the at least one tunnel element at the front end is fixable to the loading surface.

12. An access device according to claim 1, further comprising:
a stair device, the stair device having a fore end disposed towards the front end of the air passenger stair vehicle and an opposing aft end disposed towards the rear end of the air passenger stair vehicle; and
a lifting apparatus, wherein the stair device is attached to the air passenger stair vehicle, the stair device being vertically adjustable by the lifting apparatus while providing a free space above the loading surface of the air passenger stair vehicle at the front end or the rear end.

13. An access device according to claim 12, wherein the lifting apparatus is arranged at the rear end of the air passenger stair vehicle.

14. An access device according to claim 12, further comprising a vertically adjustable mounting, wherein the stair device is seated on the mounting near the front end of the air passenger stair vehicle, the stair device being displaceably disposed on the vertically adjustable mounting.

15. An access device according to claim 12, wherein the stair device comprises a substantially perpendicular connecting frame at the aft end in a lowered state of the stair device.

16. An access device according to claim 15, wherein the stair device further comprises a connecting stair segment towards the aft end and the stair device telescopically receives the connecting stair segment.

17. An access device according to claim 15, wherein the stair device and/or the connecting stair segment are/is tunneled.

18. An access device according to claim 12, wherein the lifting apparatus comprises two lifting columns by which the stair device is displaceably guided in a vertically adjustable manner.

19. An access device to an aircraft, bus or building for passengers, comprising:
a loading surface connected to an air passenger stair vehicle, the air passenger stair vehicle having a front end and an opposing rear end;
a protective device disposed on the loading surface, the protective device having a first end and an opposing second end, at least the second end of the protective device having rollers operable to enable the second end to be removable from the loading surface to a ground surface;
a stair device, the stair device having a fore end disposed towards the front end of the air passenger stair vehicle and an opposing aft end disposed towards the rear end of the air passenger stair vehicle; and
a lifting apparatus, wherein the stair device is attached to the air passenger stair vehicle, the stair device being vertically adjustable by the lifting apparatus while providing a free space above the loading surface of the air passenger stair vehicle at the front end or the rear end.

20. An access device to an aircraft, bus or building for passengers, comprising:
a loading surface connected to an air passenger stair vehicle, the air passenger stair vehicle having a front end and an opposing rear end;
a protective device disposed on the loading surface, the protective device having a first end and an opposing second end, the second end of the protective device configured to be removable from the loading surface to a ground surface;
a stair device comprising:
a substantially perpendicular connecting frame and a connecting stair segment, the stair device is attached to the air passenger stair vehicle, the stair device having a fore end disposed towards the front end of the air passenger stair vehicle and an opposing aft end disposed towards the rear end of the air passenger stair vehicle, such that the substantially perpendicular connecting frame is disposed at the aft end in a lowered state of the stair device, the connecting stair segment is disposed towards the aft end and the stair device telescopically receives the connecting stair segment; and
a lifting apparatus, the stair device being vertically adjustable by the lifting apparatus while providing a free space above the loading surface of the air passenger stair vehicle at the front end or the rear end.

21. An access device to an aircraft, bus or building for passengers, comprising:
a loading surface connected to a vehicle, the loading surface having a chassis and the chassis receives the loading surface in a lowerable manner; and
a protective device disposed on the loading surface, the protective device having a first end and an opposing second end, at least the second end of the protective device having rollers operable to enable the second end to be removable from the loading surface to a ground surface.

* * * * *